Patented May 2, 1933

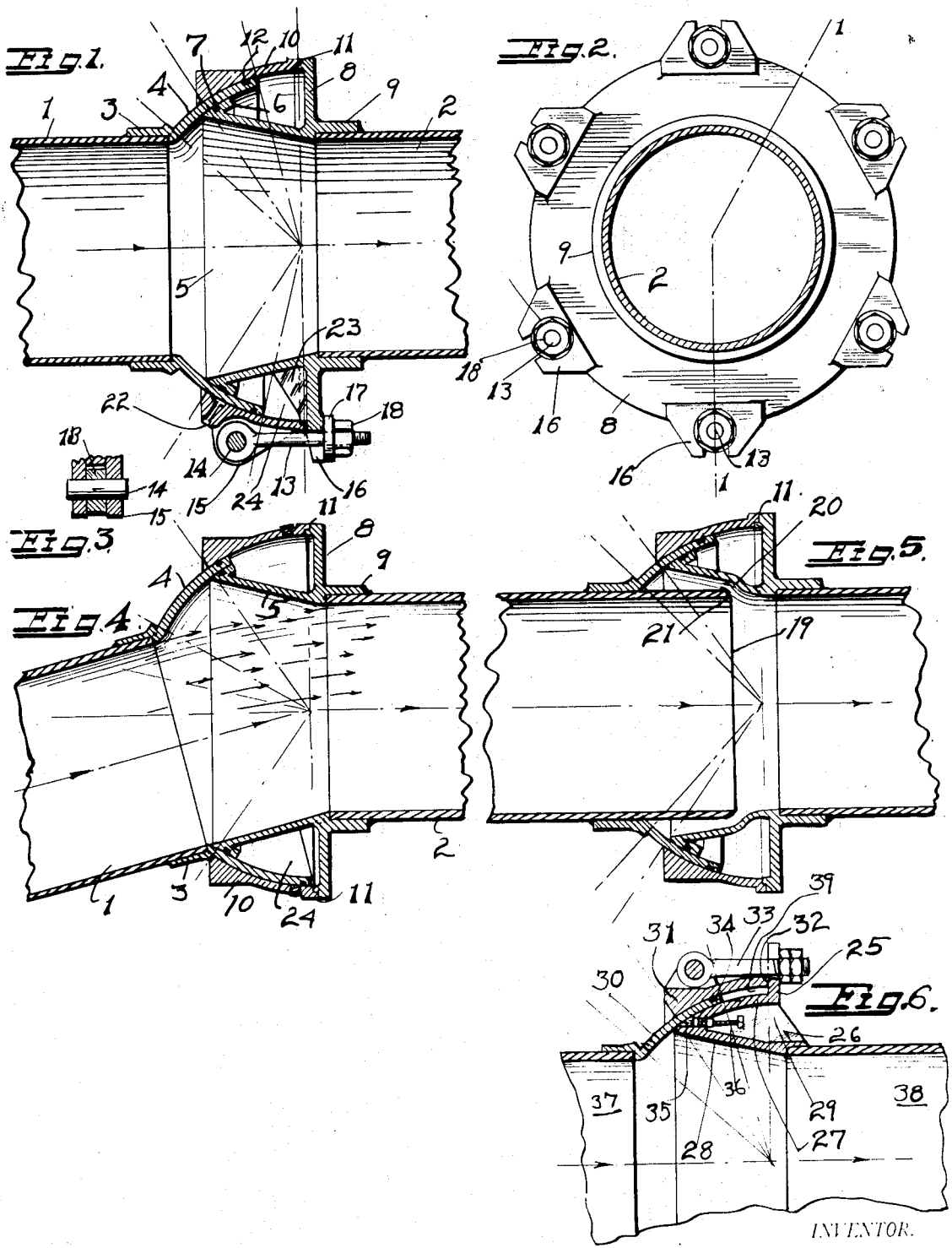

1,906,575

UNITED STATES PATENT OFFICE

OSCAR C. GOERIZ, OF OAKLAND, CALIFORNIA

BALL JOINT FOR PIPE LINES

Application filed November 3, 1930. Serial No. 493,095.

This invention relates to improvements in ball joints for pipe lines and more particularly to ball joints for pipe lines mounted on pontoons for hydraulic suction dredging.

It is well understood by engineers that the resistance to the flow through pipes mounted on pontoons is much greater than that of pipes on the shore line, and the difference is caused to a great extent by losses in the joints, and the principal object of my invention is to produce a ball joint whereby the losses are greatly reduced, consequently reducing the wear and tear of the ball joints and the adjoining pipe portions, and to provide a ball joint in which the flow therethrough is not restricted at any angle of the joining pipes.

And furthermore to make a larger part of the pump pressures available for the losses in the straight portions of the pipes, and to prolongate the life of the joints as well as to gain by the increase of output.

Another object is to provide a ball joint having means to keep it lubricated.

Another object is to provide a ball joint in which the wear can be taken up and readjusted.

Another object is the provision of means of extending the end of the delivery pipe very close to the end of the receiving pipe thus affording an extended guide for the fluid where such joints are used for carrying liquids which are free from impurities.

Another object is to provide a form of the device in which the packing can be adjusted and to provide means for using the Alemite lubrication system on the bearing surfaces.

Other objects will appear to those skilled in this art as the description progresses.

An embodiment of the invention is shown in the accompanying drawing in which the same reference numeral is applied to the same portions throughout the several views and of which there may be modifications.

Figure 1 is a sectional view of the improved ball joint, taken on the line 1—1 of Figure 2.

Figure 2 is an end view of the ball joint.

Figure 3 is a detail of bolt mounting in section.

Figure 4 is a sectional view showing the joined pipes at the greatest angle of deflection.

Figure 5 is a modified form of joint.

Figure 6 is a portion of a ball joint of modified form.

The numeral 1 indicates a portion of a pipe from which the fluid is adapted to flow to the pipe 2.

The pipe 1 has welded thereon the collar portion 3 integral with the partly spherical, or ball member 4, which is finished on the outside and inside surfaces, the receiving funnel 5 with the portion of a male ball surface 6 conforms with the inside surface of the ball member 4. The surface 6 is provided with an annular groove into which a sealing ring 7 of suitable material is laid, preferably pure gum or rubber is used. The funnel member is cast in one piece with the flange member 8, and the collar 9, the pipe 2 is welded in the collar as shown, a coupling ring or shell 10 is provided, the inside surface of which conforms to the outside of the ball member 4. This ring is drawn up tight with the interlocking and centering edges 11 together, leaving the ball movable and sealed by the ring 12 of suitable material. The bolts 13 hinged at 14 on lugs 15 of the ring are adapted to engage the slotted lug 16 on the flange member 8. The washer 17 and nut 18 hold the ring in place. In the modified form shown in Figure 5 the pipe 1 extends close to the ball center as shown at 19. In this form the funnel walls may be curved out somewhat as shown at 20 and also the corners 21 of the pipe may be rounded up to allow for the desired angle with the end of pipe as close as possible to the center line of the ball, in other words the end of the discharge pipe has an extension which extends into the funnel member and up close to the beginning proper of the receiving pipe so as to form an approximately continuous hydraulic bend or knee which allows of an unrestricted passage for the fluid at any angle of the pipes.

Provision is made for the use of Alemite as shown at 22. Ribs 23 are provided opposite each of the lugs 16. The space 24 may be filled with heavy oil or other suitable lubricant.

In the modified form of ball and socket joint shown in Figure 6 the flange member 25 does not extend to the collar 26 but it is cast integral with inside socket member 27 and the funnel member 28 and braced by the ribs 29, the ball member 30 is engaged on its inner face by the socket member 27 and on the outer surface by the socket ring 31 which is drawn up with its edge member 32 against the flange 25, by the bolts 33, a suitable packing ring 34 is provided. A packing ring 35 is adjusted by the bolt 36, and as this bolt is placed between the ribs it is convenient to adjust. The pipe ends 37 and 38 are welded on in the usual way.

One advantage of this form of the invention is that more bearing surface is afforded on the inside socket member and another is the adjustable packing ring. And still another advantage is that the space 39 is much less than the space 24 of Figure 4, therefore less expensive to fill with lubricant.

In addition to providing a ball joint with an unrestricted area my invention also improves the coupling means and greatly lessens the wear and frictional losses resulting from the thrust, pull and twisting of the joint when mounted on pontoons and subject to the pitching of the waves.

In the ball joint now in use the axial force which tends to part the joint is opposed by the resistance of the left hand side of the male ball surface. But when the hydraulic pressure is reduced and the pontoons are pushed by wind and tide against one another, the forces are resisted by the right hand male ball surface of the common ball joint whereas they are resisted by the left hand male surface of member 5 of the improved ball joint.

The receiving funnel shaped member has approximately twice the angle of deflection so that the liquid may pass into the pipe 2 with practically no contraction or obstruction.

It will be seen from the above description taken with the drawing that a very great advance has been made in the art.

Having thus described my invention what I desire to protect by Letters Patent is as follows, but modifications may be had in carrying out the invention as shown in the drawing and particularly described form within the purview of the annexed claims.

I claim:

1. A ball pipe joint comprising less than a half portion of a spherical member, a member bearing on the inside surface of the spherical member, a ring member bearing on the outside surface of the spherical member, a pipe fixed to said spherical member, the end of which extends to a line approximate to the center of said spherical member, a funnel member forming part of the member bearing on the inside surface of said spherical member, and means to secure said ring member to the funnel member.

2. A ball pipe joint comprising a portion of a spherical member, a member having a portion of a spherical surface bearing on the inside of said spherical member, a ring member having a portion of a spherical surface bearing on the outside of said spherical member, an inflow pipe fixed to said spherical member, the end of which extends approximately to the center line of said spherical members.

3. A ball joint for the pontoon pipes of suction dredges comprising a discharge pipe, and a receiving pipe, a portion of a spherical shell on the discharge pipe, a portion of a spherical surface bearing on the inside of said shell and fixed to said receiving pipe, a ring member having a portion of a spherical surface bearing on the outside of said spherical shell and secured to said receiving pipe, an extension on the end of said discharge pipe extending in close proximity to the end of said receiving pipe.

4. A ball joint for the pontoon pipes of suction dredges comprising a discharge pipe and a receiving pipe, a portion of a spherical shell on said discharge pipe, a funnel shaped member having a portion of a spherical surface bearing on the inside surface of said shell and fixed to said receiving pipe, a ring member having a portion of a spherical surface bearing on the outside surface of said shell and secured to said receiving pipe, an extension on the end of said discharge pipe extending into said funnel and in close proximity to the end of said receiving pipe.

5. A ball joint for the pontoon pipes of suction dredges comprising a discharge pipe and a receiving pipe the ends of which are close to each other, a portion of a spherical shell including a band spaced from the end and fixed to said discharge pipe, a funnel member fixed to said receiving pipe and having a portion of a spherical surface bearing on the inside surface of said shell, a flange on said funnel member, a ring having a portion of a spherical surface bearing on the outside surface of said shell and secured to said flange.

6. A ball joint for pontoon pipes of suction dredges comprising a discharge pipe and a receiving pipe, a portion of a spherical shell fixed on said discharge pipe, a flange member on said receiving pipe, a funnel shaped member on said flange, a portion of a spherical surface bearing on the inside surface of said shell and fixed to said funnel member, a ring having a portion of a spherical surface bearing on the outside surface of said shell and secured to said flange member, an extension on the end of said discharge pipe into said funnel member and up close to the beginning proper of said receiving pipe so as to form an approximately continuous and unrestricted passage for fluids at any angle of the pipes.

7. A ball joint for pontoon pipes of suction dredges comprising a discharge pipe, and a receiving pipe having the ends thereof in close proximity and in axial relation with each other, a portion of a spherical shell having its radial center between said pipes and on the center line thereof, said spherical shell being mounted on said discharge pipe a short distance from the end thereof, a funnel shaped member having a portion of a spherical surface bearing on the inside surface of said shell and fixed to, and projecting from the end of said receiving pipe, a flange member on said funnel shaped member, and a ring member having a portion of a spherical surface bearing on the outside surface of said spherical shell and fixed to said flange.

OSCAR C. GOERIZ.